United States Patent
Appelman et al.

(10) Patent No.: US 8,001,199 B2
(45) Date of Patent: *Aug. 16, 2011

(54) RECONFIGURING AN ELECTRONIC MESSAGE TO EFFECT AN ENHANCED NOTIFICATION

(75) Inventors: Barry Appelman, McLean, VA (US); Muhammad Mohsin Hussain, Mountain View, CA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/626,099

(22) Filed: Nov. 25, 2009

(65) Prior Publication Data

US 2010/0077049 A1 Mar. 25, 2010

Related U.S. Application Data

(63) Continuation of application No. 10/715,206, filed on Nov. 18, 2003, now Pat. No. 7,640,306.

(60) Provisional application No. 60/428,234, filed on Nov. 22, 2002, provisional application No. 60/426,806, filed on Nov. 18, 2002.

(51) Int. Cl.
*G06F 15/16* (2006.01)
(52) U.S. Cl. ........................... 709/206; 709/204
(58) Field of Classification Search ................. None
See application file for complete search history.

(56) References Cited

U.S. PATENT DOCUMENTS

| | | | |
|---|---|---|---|
| 4,650,927 A | 3/1987 | James | |
| 4,817,129 A | 3/1989 | Riskin | |
| 5,276,905 A | 1/1994 | Hurst et al. | |
| 5,592,538 A | 1/1997 | Kosowsky et al. | |
| 5,646,982 A | 7/1997 | Hogan et al. | |
| 5,749,081 A | 5/1998 | Whiteis et al. | |
| 5,771,280 A | 6/1998 | Johnson | |
| 5,793,365 A | 8/1998 | Tang et al. | |
| 5,802,470 A | 9/1998 | Gaulke et al. | |
| 5,835,905 A | 11/1998 | Pirolli et al. | |
| 5,845,300 A | 12/1998 | Comer et al. | |
| 5,867,162 A | 2/1999 | O'Leary et al. | |
| 5,870,744 A | 2/1999 | Sprague | |

(Continued)

FOREIGN PATENT DOCUMENTS

EP 1 054 329 11/2000

(Continued)

OTHER PUBLICATIONS

USPTO Final Office Action issued in U.S. Appl. No. 10/651,303, mailed Nov. 27, 2009, 19 pages.

(Continued)

*Primary Examiner* — John B. Walsh
(74) *Attorney, Agent, or Firm* — Finnegan, Henderson Farabow, Garrett & Dunner, L.L.P.

(57) ABSTRACT

An electronic message may be reconfigured to effect an enhanced notification using an input interface to receive at least one electronic message created by or on behalf of a message source for delivery to an intended recipient. A matching engine determines whether the electronic message corresponds to a predetermined definition of an enhanced notification. An enhancement engine reconfigures the electronic message to the enhanced notification if stored information related to the intended recipient indicates that the intended recipient is subscribed to receive the enhanced notification. Reconfiguring the electronic message may include reconfiguring the message to provide special handling, routing or presentation.

26 Claims, 10 Drawing Sheets

U.S. PATENT DOCUMENTS

| | | |
|---|---|---|
| 5,895,454 A | 4/1999 | Harrington |
| 5,896,321 A | 4/1999 | Miller et al. |
| 5,913,032 A | 6/1999 | Schwartz et al. |
| 5,933,477 A | 8/1999 | Wu |
| 5,940,488 A | 8/1999 | DeGrazia et al. |
| 5,950,193 A | 9/1999 | Kulkarni |
| 5,960,429 A | 9/1999 | Peercy et al. |
| 5,999,932 A | 12/1999 | Paul |
| 6,041,311 A | 3/2000 | Chislenko et al. |
| 6,065,047 A | 5/2000 | Carpenter et al. |
| 6,067,561 A | 5/2000 | Dillon |
| 6,073,138 A | 6/2000 | de l'Etraz et al. |
| 6,092,049 A | 7/2000 | Chislenko et al. |
| 6,115,455 A | 9/2000 | Picard |
| 6,161,130 A | 12/2000 | Horvitz et al. |
| 6,175,859 B1 | 1/2001 | Mohler |
| 6,189,026 B1 | 2/2001 | Birrell et al. |
| 6,199,103 B1 | 3/2001 | Sakaguchi et al. |
| 6,208,996 B1 | 3/2001 | Ben-Shachar et al. |
| 6,237,092 B1 | 5/2001 | Hayes, Jr. |
| 6,247,043 B1 | 6/2001 | Bates et al. |
| 6,260,148 B1 | 7/2001 | Aggarwal et al. |
| 6,269,369 B1 | 7/2001 | Robertson |
| 6,292,743 B1 | 9/2001 | Pu et al. |
| 6,324,541 B1 | 11/2001 | de l'Etraz et al. |
| 6,327,590 B1 | 12/2001 | Chidlovskii et al. |
| 6,330,590 B1 | 12/2001 | Cotten |
| 6,349,299 B1 | 2/2002 | Spencer et al. |
| 6,360,251 B1 | 3/2002 | Fujita et al. |
| 6,374,246 B1 | 4/2002 | Matsuo |
| 6,374,290 B1 | 4/2002 | Scharber et al. |
| 6,389,372 B1 | 5/2002 | Glance et al. |
| 6,392,669 B1 | 5/2002 | Matoba et al. |
| 6,415,318 B1 | 7/2002 | Aggarwal et al. |
| 6,421,709 B1 | 7/2002 | McCormick et al. |
| 6,430,604 B1 | 8/2002 | Ogle et al. |
| 6,449,634 B1 | 9/2002 | Capiel |
| 6,457,044 B1 | 9/2002 | IwaZaki |
| 6,460,073 B1 | 10/2002 | Asakura |
| 6,463,471 B1 | 10/2002 | Dreke et al. |
| 6,466,918 B1 | 10/2002 | Spiegel et al. |
| 6,507,866 B1 | 1/2003 | Barchi |
| 6,529,903 B2 | 3/2003 | Smith et al. |
| 6,549,933 B1 | 4/2003 | Barrett et al. |
| 6,549,937 B1 | 4/2003 | Auerbach et al. |
| 6,564,213 B1 | 5/2003 | Ortega et al. |
| 6,564,264 B1 | 5/2003 | Creswell et al. |
| 6,567,796 B1 | 5/2003 | Yost et al. |
| 6,567,807 B1 | 5/2003 | Robles et al. |
| 6,571,234 B1 | 5/2003 | Knight et al. |
| 6,584,494 B1 | 6/2003 | Manabe et al. |
| 6,606,657 B1 | 8/2003 | Zilberstein et al. |
| 6,615,237 B1 | 9/2003 | Kyne et al. |
| 6,615,241 B1 | 9/2003 | Miller et al. |
| 6,618,747 B1 | 9/2003 | Flynn et al. |
| 6,636,888 B1 | 10/2003 | Bookspan et al. |
| 6,643,669 B1 | 11/2003 | Novak et al. |
| 6,677,968 B1 | 1/2004 | Appelman |
| 6,678,719 B1 | 1/2004 | Stimmel |
| 6,687,362 B1 | 2/2004 | Lindquist et al. |
| 6,687,745 B1 | 2/2004 | Franco et al. |
| 6,694,353 B2 | 2/2004 | Sommerer |
| 6,697,824 B1 | 2/2004 | Bowman-Amuah |
| 6,701,348 B2 | 3/2004 | Sommerer |
| 6,714,791 B2 | 3/2004 | Friedman |
| 6,721,784 B1 | 4/2004 | Leonard et al. |
| 6,731,308 B1 | 5/2004 | Tang et al. |
| 6,732,103 B1 | 5/2004 | Strick et al. |
| 6,732,185 B1 | 5/2004 | Reistad |
| 6,750,881 B1 | 6/2004 | Appelman |
| 6,751,603 B1 | 6/2004 | Bauer et al. |
| 6,772,188 B1 | 8/2004 | Cloutier |
| 6,782,414 B1 | 8/2004 | Xue et al. |
| 6,788,769 B1 | 9/2004 | Waites |
| 6,829,607 B1 | 12/2004 | Tafoya et al. |
| 6,853,982 B2 | 2/2005 | Smith et al. |
| 6,854,007 B1 | 2/2005 | Hammond |
| 6,912,505 B2 | 6/2005 | Linden et al. |
| 6,912,563 B1 | 6/2005 | Parker et al. |
| 6,912,564 B1 | 6/2005 | Appelman et al. |
| 6,917,965 B2 | 7/2005 | Gupta et al. |
| 6,934,367 B1 | 8/2005 | LaPierre et al. |
| 6,999,566 B1 | 2/2006 | Eason et al. |
| 7,007,008 B2 | 2/2006 | Goel et al. |
| 7,007,228 B1 | 2/2006 | Carro |
| 7,031,961 B2 | 4/2006 | Pitkow et al. |
| 7,035,865 B2 | 4/2006 | Doss et al. |
| 7,058,690 B2 | 6/2006 | Maehiro |
| 7,089,237 B2 | 8/2006 | Turnbull et al. |
| 7,096,214 B1 | 8/2006 | Bharat et al. |
| 7,133,506 B1 | 11/2006 | Smith |
| 7,146,416 B1 | 12/2006 | Yoo et al. |
| 7,185,059 B2 | 2/2007 | Daniell et al. |
| 7,275,215 B2 | 9/2007 | Werndorfer et al. |
| 7,370,035 B2 | 5/2008 | Gross et al. |
| 7,640,306 B2 * | 12/2009 | Appelman et al. ............ 709/206 |
| 2001/0002469 A1 | 5/2001 | Bates et al. |
| 2001/0005861 A1 | 6/2001 | Mousseau et al. |
| 2001/0016823 A1 | 8/2001 | Richards et al. |
| 2002/0021307 A1 | 2/2002 | Glenn et al. |
| 2002/0032742 A1 | 3/2002 | Anderson |
| 2002/0049610 A1 | 4/2002 | Gropper |
| 2002/0049704 A1 | 4/2002 | Vanderveldt et al. |
| 2002/0049751 A1 | 4/2002 | Chen et al. |
| 2002/0052921 A1 | 5/2002 | Morkel |
| 2002/0059401 A1 | 5/2002 | Austin |
| 2002/0065894 A1 | 5/2002 | Dalal et al. |
| 2002/0078077 A1 | 6/2002 | Baumann et al. |
| 2002/0091667 A1 | 7/2002 | Jaipuria et al. |
| 2002/0097856 A1 | 7/2002 | Wullert, II |
| 2002/0116463 A1 | 8/2002 | Hart |
| 2002/0116528 A1 | 8/2002 | Vale |
| 2002/0116641 A1 | 8/2002 | Mastrianni |
| 2002/0120687 A1 | 8/2002 | Diacakis et al. |
| 2002/0123328 A1 | 9/2002 | Snip et al. |
| 2002/0123988 A1 | 9/2002 | Dean et al. |
| 2002/0133369 A1 | 9/2002 | Johnson |
| 2002/0138650 A1 | 9/2002 | Yamamoto et al. |
| 2002/0151294 A1 | 10/2002 | Kirby et al. |
| 2002/0160757 A1 | 10/2002 | Shavit et al. |
| 2002/0160805 A1 | 10/2002 | Laitinen et al. |
| 2002/0165729 A1 | 11/2002 | Kuebert et al. |
| 2002/0169748 A1 | 11/2002 | Macholda |
| 2002/0175953 A1 | 11/2002 | Lin |
| 2002/0181703 A1 | 12/2002 | Logan et al. |
| 2002/0184089 A1 | 12/2002 | Tsou et al. |
| 2002/0184128 A1 | 12/2002 | Holtsinger |
| 2002/0199095 A1 | 12/2002 | Bandini et al. |
| 2003/0004872 A1 | 1/2003 | Gardi et al. |
| 2003/0009385 A1 | 1/2003 | Tucciarone et al. |
| 2003/0018704 A1 | 1/2003 | Polychronidis et al. |
| 2003/0018747 A1 | 1/2003 | Herland et al. |
| 2003/0023681 A1 | 1/2003 | Brown |
| 2003/0028524 A1 | 2/2003 | Keskar et al. |
| 2003/0028595 A1 | 2/2003 | Vogt et al. |
| 2003/0037112 A1 | 2/2003 | Fitzpatrick |
| 2003/0052915 A1 | 3/2003 | Brown |
| 2003/0054830 A1 | 3/2003 | Williams et al. |
| 2003/0055897 A1 | 3/2003 | Brown |
| 2003/0058478 A1 | 3/2003 | Aoki |
| 2003/0081001 A1 | 5/2003 | Munro |
| 2003/0105682 A1 | 6/2003 | Dicker et al. |
| 2003/0105822 A1 | 6/2003 | Gusler et al. |
| 2003/0110056 A1 | 6/2003 | Berghofer et al. |
| 2003/0119561 A1 | 6/2003 | Hatch et al. |
| 2003/0131143 A1 | 7/2003 | Myers |
| 2003/0154254 A1 | 8/2003 | Awasthi |
| 2003/0158860 A1 | 8/2003 | Caughey |
| 2003/0158902 A1 | 8/2003 | Volach |
| 2003/0167324 A1 | 9/2003 | Farnham et al. |
| 2003/0208547 A1 | 11/2003 | Branimir |
| 2003/0220946 A1 | 11/2003 | Malik |
| 2003/0227894 A1 | 12/2003 | Wang et al. |
| 2003/0229668 A1 | 12/2003 | Malik |
| 2003/0233413 A1 | 12/2003 | Becker |
| 2004/0010808 A1 | 1/2004 | deCarmo |
| 2004/0019645 A1 | 1/2004 | Goodman et al. |

| | | | |
|---|---|---|---|
| 2004/0029572 | A1 | 2/2004 | Nerot |
| 2004/0030741 | A1 | 2/2004 | Wolton et al. |
| 2004/0044536 | A1 | 3/2004 | Fitzpatrick et al. |
| 2004/0044736 | A1 | 3/2004 | Austin-Lane et al. |
| 2004/0054646 | A1 | 3/2004 | Daniell et al. |
| 2004/0054736 | A1 | 3/2004 | Daniell et al. |
| 2004/0059708 | A1 | 3/2004 | Dean et al. |
| 2004/0078440 | A1 | 4/2004 | Potter et al. |
| 2004/0117443 | A1 | 6/2004 | Barsness |
| 2004/0122810 | A1 | 6/2004 | Mayer |
| 2004/0133564 | A1 | 7/2004 | Gross et al. |
| 2004/0148347 | A1 | 7/2004 | Appelman et al. |
| 2004/0203766 | A1 | 10/2004 | Jenniges et al. |
| 2004/0204140 | A1 | 10/2004 | Nagata |
| 2004/0215721 | A1 | 10/2004 | Szeto et al. |
| 2004/0215793 | A1 | 10/2004 | Ryan et al. |
| 2004/0267604 | A1 | 12/2004 | Gross et al. |
| 2005/0004978 | A1 | 1/2005 | Reed et al. |
| 2005/0027382 | A1 | 2/2005 | Kirmse et al. |
| 2005/0050143 | A1 | 3/2005 | Guster et al. |
| 2005/0076241 | A1 | 4/2005 | Appelman |
| 2005/0102202 | A1 | 5/2005 | Linden et al. |
| 2006/0259344 | A1 | 11/2006 | Patel et al. |
| 2006/0259476 | A1 | 11/2006 | Kadayam et al. |
| 2008/0133417 | A1 | 6/2008 | Robinson |

FOREIGN PATENT DOCUMENTS

| | | |
|---|---|---|
| GB | 2357932 | 7/2001 |
| JP | 04-086950 | 3/1992 |
| JP | 08-123821 | 5/1996 |
| JP | 09-247334 | 9/1997 |
| JP | 11-161682 | 6/1999 |
| JP | 11-328194 | 11/1999 |
| JP | 2000-148795 | 5/2000 |
| JP | 2002-132832 | 5/2002 |
| WO | 01/80079 | 5/2001 |
| WO | 02/03216 | 1/2002 |
| WO | WO 0293400 | 11/2002 |
| WO | WO 0293875 | 11/2002 |
| WO | 01/06748 | 1/2004 |

OTHER PUBLICATIONS

.Net Alerts Overview; Nov. 7, 2002; microsoft.com; pp. 1-3.
"A Countermeasure to Duplicate-detecting Anti-spam Techniques," Robert J. Hall, AT&T Labs Technical Report 99.9.1, 1999, Abst. (27 pages).
"Announce: Implementation of E-mail Spam Proposal," Maurice L. Marvin, news.admin.netabuse.misc, Aug. 3, 1996, 2 pages.
"Better Bayesian Filtering," Paul Graham, Jan. 2003, pp. 1-11, http://www.paulgraham.com/better.html.
"Degrees of Separation Email Spam Protection," Halfbakery: Degrees of Separation Email Spam Protection, reprinted from http://halfbakery.com/idea/Degrees__20of__20Separation__20Email__20Spam__20Protecti . . . printed on Mar. 1, 2004 (3 pages).
"Digital Artifacts for Remembering and Storytelling: Post History and Social Network Fragments," Viegas et al., retrieved from the World Wide Web: http://we.media.mit.edu/~fviegas/papers/posthistory_snf.pdf, (10 pages), Jan. 2004.
"Google Zeitgeist—Search patterns, trends, and surprises according to Google," Jan. 2003, pp. 1-2, http://www.google.com/press/zeitgeist.html, (visited Feb. 13, 2003).
"Icq.anywhere, Email Features—Email Center—ICQ.com," retrieved Apr. 29, 2004 from the World Wide Web: http://www.icq.com/email/popular-features.html, (5 pages).
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl+0&adxnnlx=107029 . . . , printed on Nov. 5, 2004 (2 pages).
"Instant Messaging for Gamers," PC Gamer, May 2004, vol. 11, No. 5, (2 pages).
"Learning Spam: Simple Techniques for Freely-Available Software," Bart Massey et al, Computer Science Dept., Portland, OR USA, 2003, pp. 1-14.
"Learning to Filter Spam E-Mail: A Comparison of a Naïve Bayesian and a Memory-Based Approach," Ion Adroutsopoulos et al., University of Athens, Sep. 2000, pp. 1-12.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, (3 pages).
"PieSpy—Inferring and Visualizing Social Network on IRC," PieSpy Social Network Bot, reprinted from http://lister.linux-srv.anlx.net/piespy printed on Mar. 11, 2004 (18 pages).
"plaxo," Plaxo, reprinted from http://web.archive.org/web/20041105072256/http://www.plaxo.com/ printed on Nov. 5, 2004 (available on Feb. 14, 2004) (2 pages).
"Plaxo—Update Your Address Book," Plaxo Contact Networks, reprinted from http://web.archive.org/web/20030218233638/http://www.plaxo.com/ printed on Nov. 5, 2004 (available on Feb. 18, 2003) (1 page).
"Reflections on Friendster, Trust and Intimacy," Danah Boyd. Ubicomp 2003, Workshop Application for the Intimate Ubiquitous Computing Workshop. Seattle, WA, Oct. 12-15, 2003, (4 pages).
"Six Degrees—New Programs Help Companies 'Mine Workers' Relationships for Key Business Prospects," William M. Bulkeley et al., Marketplace, The Wall Street Journal, Aug. 4, 2003, (3 pages).
"Social Nets Find Friends in VCs," Joanna Glasner, http://www.wired.com/news, Nov. 17, 2003, (pp.1-4).
"Social Network Fragments: An Interactive Tool for Exploring Digital Social Connections." Danah Boyd, Jeff Potter. Sketch at *SIGGRAPH* 2003. San Diego, California: ACM, Jul. 27-31, 2003, (1 page).
"Social Networking for Business: Release 0.5," Esther Dyson, Esther Dyson's Monthly Report, vol. 21, No. 10, Nov. 25, 2003, www.edventure.com, (36 pages).
"Support Vector Machines for Spam Categorization," Harris Drucker et al., IEEE Transactions on Neural Networks, vol. 10, No. 5, Sep. 1999, pp. 1048-1054, (7 pages).
"Support Vector Machines," Marti Hearst, IEEE Intelligent Systems, Jul./Aug. 1998, pp. 18-28.
"SVM-based Filtering of E-mail Spam with Content-specific Misclassification Costs," Aleksander Kolcz et al., *TextDM'*2001 (*IEEE ICDM-2001 Workshop on Text Mining*), San Jose, CA, 2001, pp. 1-14.
"Technical Solutions for Controlling Spam," Shane Hird, Proceedings of AUUG2002, Melbourne, Sep. 4-6, 2002, (17 pages).
"Text Categorization with Support Vector Machines: Learning with Many Relevant Features," Thorsten Joachims, University of Dortmund, Computer Science Dept., LS-8 Report 23, 1998, (18 pages).
"Text Categorization with Support Vector Machines: Learning with Many Relevant Features," Thorsten Joachims, University of Dortmund, Computer Science Dept., LS-8 Report 23, 1998, (18 pages), Nov. 27, 1997, revised Apr. 19, 1998.
"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).
"Will You Buy a Car From This Man?," Leander Kahney, Oct. 6, 2003, (3 pages).
Adeptra Services Overview; Nov. 7, 2002; adeptra.com; pp. 1-7.
Adeptra, Features; Nov. 27, 2002; adeptra.com; pp. 1-2.
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.com (7 pages).
Autocomplete feature of Internet Explorer, www.geocities.com/technofundo/tech/web/ie__ autocomplete.html, 6 pages, Feb 18, 2004.
Bryan Pfaffenberger, Netscape Navigator Gold, AP Professional, 1997, 4 pages.
Bryan Pfaffenberger, Netscape Navigator Gold, AP Professional, Jan. 1997, 4 pages 1997.
Canadian Office Action, Application No. 2,506,417, dated Aug. 14, 2007, 3 pages.

Cerulean Studios, "Trillian Pro: No Boundaries," (Overview, New Features, Tech Specs, Corporate, Product Tour—16 total pages), 1999-2004; first release Jul. 2000.
Cerulean Studios, "Trillian: Your Freedom to Chat," (Overview, Features, Screenshots, Tech Specs—8 total pages), 1999-2004; first release Jul. 2000.
CNET Networks Inc., "PopUp Killer", Sep. 13, 2001, Internet: download.cnet.com/downloads/0-10059-100-6932612.html, (3 pages).
CommWorks 8250 Personal Communications Management System;Dec. 11, 2002; commworks.com; pp. 1-2.
CommWorks IP Messaging; Dec. 11, 2002; commworks.com; pp. 1-2.
Convergys Interactive Alerts Reduce Customer Care Costs and Improve Customer Satisfaction; convergys.com; pp. 1-2, Jan. 22, 2002.
Danny Sullivan, "What People Search For," Search Engine Watch, http://searchenginewatch.com/facts/searches.html, 4 pages, uploaded Apr. 8, 2002; printed Dec. 13, 2003.
Danny Sullivan, "What People Search For," Search Engine Watch, pp. 1-4, http://searchenginewatch.com/facts/searches.html, (visited Feb. 13, 2003).
Ed Bott and Ron Person, Using Windows 95 with Internet Explorer 4.0, Feb. 17, 1998, Que, Special Edition, (21 pages).
European Search Report, Application No. EP 03 81 1631, dated Jun. 23, 2006, 5 pages.
Global Solutions Directory; Nov. 7, 2002; software.ibm.com; pp. 1-5.
Home-tribe.net, http://washingtondc.tribe.net/message/24434d1b-817b-4580-aa42-3bffa15f26a?page=1, (4 pages), printed from Internet Dec. 13, 2004, message dated Oct. 19, 2003.
http://www.friendster.com, (17 pages), Dec. 2004.
Index of /tarvizo/OldFiles/elips/tnt-2.4, Jul. $2^{nd}$, 2001, TNT, http://web.mit.edu/tarvizo/OldFiles/elips/tnt-2.4/, 9 pages.
Ipipi Frequently Asked Questions; Nov. 6, 2002; ipipi.com; pp. 1-2.
Jennifer 8. Lee, "From 100 countries, a Google snapshot of what's going on," International Herald Tribune, Nov. 29, 2002, pp. 1-3, http://www.iht.com.
Komatsu et al., "Text Input with Dynamic Abbreviation Expansion," IPSJ SIG Notes, vol. 2001, No. 87, Sep. 14, 2001, pp. 133-138.

McKendrick, Joseph; "Internet Call Centers: New Era in Customer Service", Feb. 2002; V10, n2, (4 pages).
Microservices: CommWorks Find Me-Follow Me Application; Dec. 11, 2002; commworks.com; pp. 1-2.
Microservices: CommWorks Message Alert System;Dec. 11, 2002; commworks.com; pp. 1-3.
Microservices: CommWorks Message Delivery System;Dec. 11, 2002; commworks.com; pp. 1-2.
Microsoft PressPass; Nov. 7, 2002; microsoft.com; pp. 1-9.
Midorikawa et al., "Part 2 Build up a Comfortable Search Environment via Customization by Rules," PC Japan, vol. 7, No. 10, pp. 172-176, Nov. 2002.
Mozilla, www.mozilla.org/projects/ml/autocomplete, Mar. 13, 2003, 6 pages.
Nick Wingfield; Technology Journal: Changing Chat—Instant Messaging is Taking Off, and for Some Users It's Nuzzling Out the Phone; Asian WSJ; Sep. 2000, (5 pages).
Office Action of Jan. 11, 2008 from copending U.S. Appl. No. 10/715,216, 55 pages.
Office Action of Oct. 22, 2007 from copending U.S. Appl. No. 10/715,213, 17 pages.
Ozmosys Enterprise; Nov. 7, 2002; ozmosys.com; pp. 1-3.
Solutions Smartdelivery; Nov. 6, 2002; centerpost.com; pp. 1-2.
Teraitech; Nov. 7, 2002; teraitech.com; 1 page.
USPTO Non-Final Office Action issued in U.S. Appl. No. 10/651,303, mailed May 1, 2009, 16 pages.
Upoc Entertainment Picks; Nov. 6, 2002; upoc.com; pp. 1-3.
Upoc Frequently Asked Questions; Nov. 6, 2002; upoc.com; pp. 1-6.
Upoc General Help; Nov. 6, 2002; upoc.com; pp. 1-2.
Upoc NYSale; Nov. 6, 2002; upoc.com; pp. 1-2.
Upoc Quick Tour; Nov. 6, 2002; upoc.com; pp. 1-9.
Upside, About Our Product; upsideweb.com; pp. 1-5, Nov. 2002.
WebleySystems; CommuniKate Unified Communications Features List; Dec. 11, 2002; webley.com; pp. 1-3.
WebmasterWorld.com Inc., "HTML and Browsers", Mar. 5, 2001, Internet: www.webmaster.com/forum21/637.htm, (2 pages).
Yahoo Buzz Index, Feb. 13, 2003, 1 page, http://buzz.yahoo.com/overall/.
YAHOO! Messenger, "Messenger Help," (4 total pages), Nov. 2002.

* cited by examiner

RECONFIGURING AN ELECTRONIC MESSAGE TO EFFECT AN ENHANCED NOTIFICATION

CROSS REFERENCE TO RELATED APPLICATIONS

This application is a continuation of U.S. application Ser. No. 10/715,206, filed Nov. 18, 2003, which claims the benefit of U.S. Provisional Application No. 60/428,234, filed Nov. 22, 2002; and U.S. Provisional Application No. 60/426,806, filed Nov. 18, 2002. The content of all of the prior applications is hereby incorporated by reference in its entirety for all purposes.

TECHNICAL FIELD

This disclosure generally relates to systems and methods of reconfiguring an electronic communication to effect an enhanced notification.

BACKGROUND

Online service providers may desire to inform their users of a wide range of information and services regarding, for example, news, weather, auctions, commercial offerings, stocks, banking, sports scores, and entertainment offerings. Many of these services and much of the information may be time sensitive or may benefit from special handling, routing or presentation. The online service providers may communicate their time sensitive offerings using emails or other basic electronic messages. For lack of individual expertise or infrastructure, the electronic messages of the online service providers may lack functionality desirable to communicate with the users in a timely and effective fashion.

SUMMARY

In one general aspect, a system reconfigures an electronic message to effect an enhanced notification using an input interface to receive at least one electronic message created by or on behalf of a message source for delivery to an intended recipient. A matching engine determines whether the electronic message corresponds to a predetermined definition of an enhanced notification. An enhancement engine reconfigures the electronic message to the enhanced notification if stored information related to the intended recipient indicates that the intended recipient is subscribed to receive the enhanced notification.

Implementations may include one or more of the following features. For example, the system may match the electronic message to the predetermined definition of the enhanced notification based on a source and a content of the electronic message. Moreover, the system may enable the intended recipient to access the electronic message by interacting with the enhanced notification.

The system may include a subscriber engine that stores subscriber information associated with the intended recipient. The subscriber engine also may subscribe the intended recipient to the enhanced notification if the intended recipient already is not subscribed.

The information related to the intended recipient may include presence information. The presence information may indicate an online presence, a device presence, and/or a physical presence of the intended recipient at a time at which the enhancement engine is preparing to provide the enhanced notification to the intended recipient. The presence information may indicate a delivery mechanism associated with the online presence of the intended recipient and that the intended recipient physically is present within a predefined distance of that or another delivery mechanism.

These general and specific aspects may be implemented using a method, a system, or a computer program, or any combination of systems, methods, and computer programs.

Other features will be apparent from the description, the drawings, and the claims.

DESCRIPTION OF DRAWINGS

Like reference symbols in the various drawings indicate like elements.

DETAILED DESCRIPTION

A message enhancement service enables a provider of enhanced notifications (e.g., notifications having a cascaded delivery or an associated lifespan) to reconfigure an electronic message from a business or other source into an enhanced notification for the intended recipient. By way of illustration, certain businesses generate emails to notify their customers, e.g., an online retailer may send a customer an email to alert the customer that The definition of the enhanced notification may include a system definition and a preference of the intended user. The definition of the enhanced notification may include a data structure appropriate to accommodate the system definition and the preference of the intended recipient. The definition of the enhanced notification also may include a delivery definition and a lifespan.

The delivery definition may include, for example, a cascaded delivery definition. The cascaded delivery definition may list several delivery mechanisms that are candidates for delivery (e.g., an email client, an instant messaging client, a mobile device, a desktop computer) and may be used in conjunction with presence information to determine a delivery mechanism that appears available to provide the enhanced notification to the intended recipient without significant delay.

The lifespan includes a time period during which information of the enhanced notification reasonably may be expected usefully to inform an action of the intended recipient. Based on the lifespan, the system may vacate, update, or modify an enhanced notification provided to the intended recipient but not accessed during the lifespan.

For example, the system may provide a plurality of instances of an enhanced notification to the intended recipient based on the lifespan. The system then may sense that an instance of the enhanced notification has been accessed by the intended recipient. In response, the system may vacate or modify other instances of the enhanced notification not yet accessed by the intended recipient.

The system also may include a notification archive to store enhanced notifications (e.g., delivered notifications and/or notifications for which delivery was attempted) and to record historical information related to at least one of the enhanced notifications. ordered merchandise is available. A notification provider may transform that business' primitive email notification into enhanced notifications (e.g. an alert notification deliverable in various forms to various types of clients). The notification provider may or may not partner with the business that generates the notification emails. In any event, a partner business can leverage the infrastructure of the notification provider to deliver more potent services to its own customers. Moreover, the notification provider independently may provide full-functioned notifications intelligently determined based on emails or other electronic messages received by the intended recipient.

Figure 1:
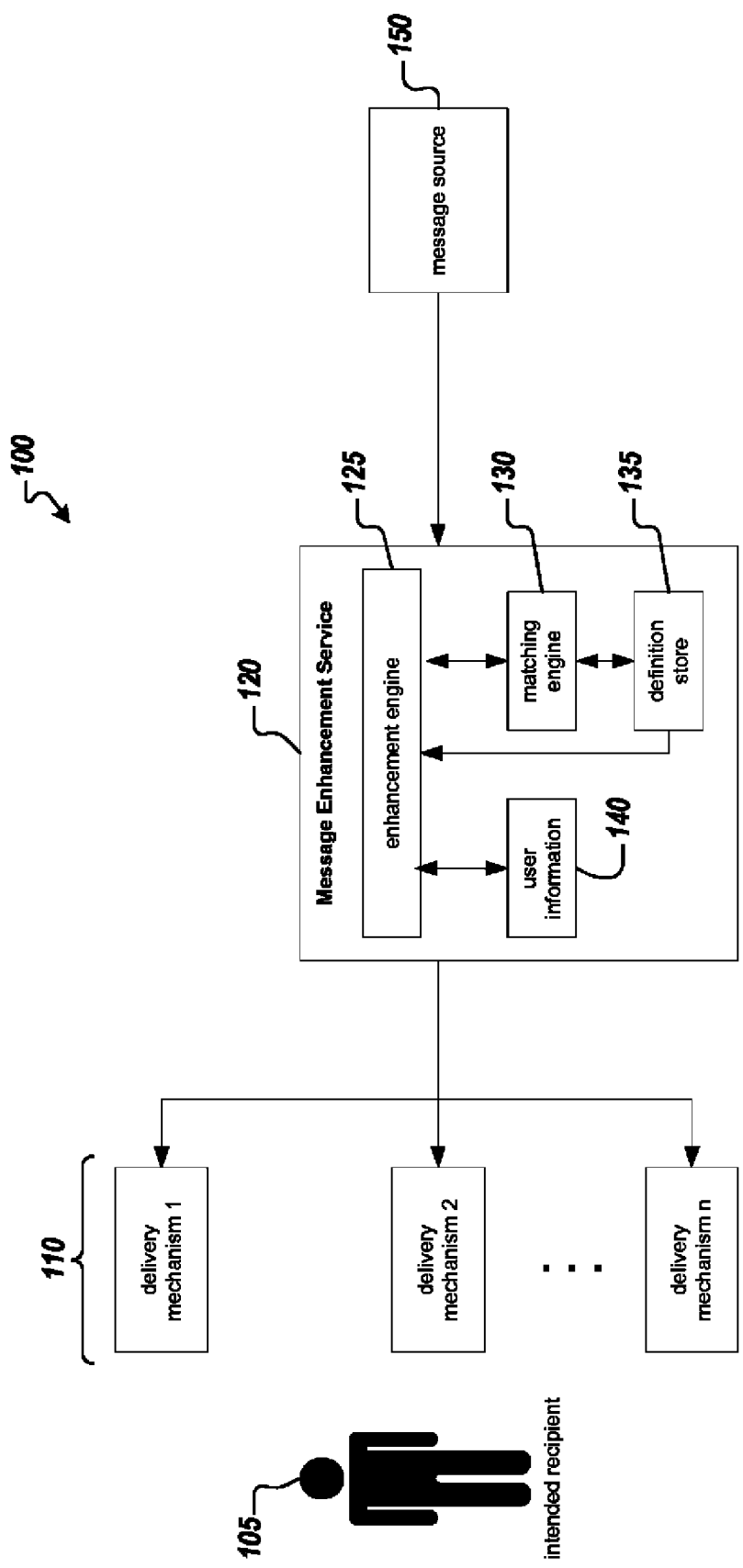
FIG. 1 is a schematic diagram of an electronic communication system capable of reconfiguring an electronic message to effect an enhanced notification.

FIG. 1 shows a generalized system 100 that reconfigures an electronic message directed to intended recipient 105 and provides an enhanced notification based on the electronic message at one or more candidate delivery mechanisms 110. The candidate delivery mechanisms 110 generally may include any device, system, and/or piece of code that relies on another service to perform an operation. The candidate delivery mechanisms 110 may include, for example, a fixed or mobile communication device, whether wired or wireless, and/or a software application, such as, for example, a messaging application or a browser. The candidate delivery mechanisms 110 also may include any protocols (i.e., standards, formats, conventions, rules, and structures) or delivery channels $A_1$-$A_N$ appropriate for corresponding devices or applications of the candidate delivery mechanisms 110. The protocols or delivery channels $A_1$-$A_N$ may include, for example, one or more other systems, such as for example, one or more wired networks and/or one or more wireless networks.

A message enhancement service 120 communicates with a message source 150 and receives the electronic message directed to the intended recipient 105. The message enhancement service 120 includes an enhancement engine 125, a matching engine 130, a definition store 135, and user information 140.

The enhancement engine 125 may be configured to reconfigure the electronic message to the enhanced notification based on interaction with the matching engine 130, the definition store 135, and the user information 140. The matching engine 130 may compare the electronic message to a notification definition of the notification store 135, and may inform the enhancement engine 125 if a correspondence exists. If the electronic message corresponds to a notification definition of the definition store 135, the enhancement engine 125 may access the user information 140 to determine whether the intended recipient 105 is subscribed to the notification. If the intended recipient 105 is subscribed, the enhancement engine 125 uses information of the definition store 135 to reconfigure the electronic message to the enhanced notification. The enhancement engine 125 provides the enhanced notification to the intended recipient 105 at one or more of the candidate delivery mechanisms 110. In any event, the definition store 135 and the user information 140 may be used for either of determining whether to reconfigure, or determining how to reconfigure the electronic message. Moreover, certain implementations may segregate, physically or conceptually, the functions of determining whether to reconfigure and of determining how to reconfigure the electronic message.

The enhancement engine 125 provides the enhanced notification based on an applicable notification definition within the definition store 135 and/or applicable user information 140. An applicable notification definition and/or applicable user information may be identified and accessed based on the identify of the message source or intended recipient or based on attributes of the message. The notification definition may include a delivery definition, for example, a delivery precedence, a hierarchical delivery rule, or any other logical rule or definition that may be used to control delivery of the enhanced notification. The user information, on the other hand, may include information indicating an online presence of the intended recipient 105. The enhancement engine 125 may be configured to determine one or more preferred delivery options based on the delivery definition, the presence information, and/or other information. That is, in general, the enhancement engine 125 may select from among the candidate delivery mechanisms 110 an actual delivery mechanism that is expected to provide the message to the intended recipient 105 without significant delay.

The notification definition also may include a notification lifespan. The lifespan may represent a period during which the enhanced notification is expected to be relevant to the intended recipient 105. Delivery of the notification based on the lifespan enhances the likelihood that the enhanced notification will be provided to the intended recipient 105 at a time at which the notification will be useful. The lifespan may be used to avoid untimely delivery of the notification that may cause the intended recipient to view the notification as not useful and/or as an annoyance. That is, in general, the enhancement engine 125 provides the enhanced notification to the intended recipient 105 only while the enhanced notification is expected to be relevant based on the notification lifespan included in an applicable notification definition.

The message source 150 typically may include any source of an electronic message. The message source 150 may employ one or more protocols to transfer information internally or to communicate the electronic message to the message enhancement service 120.

Both the message enhancement service 120 and the message source 150 further may include various mechanisms for delivering voice and/or non-voice data. The various mechanisms may include, for example, any applications, protocols, devices, or networks used to facilitate communication of electronic data. Both the message enhancement service 120 and the message source 150 also may include or be included in a general-purpose or a special-purpose computer, a local area network, and/or a wide area network. The response to and execution of instructions received by the message enhancement service 120, the message source 150, or any of their components (collectively the system services), may be controlled by, for example, a program, a piece of code, an instruction, a device, a computer system, or a combination thereof, for independently or collectively instructing the system services to interact and operate as described herein.

Figure 2:
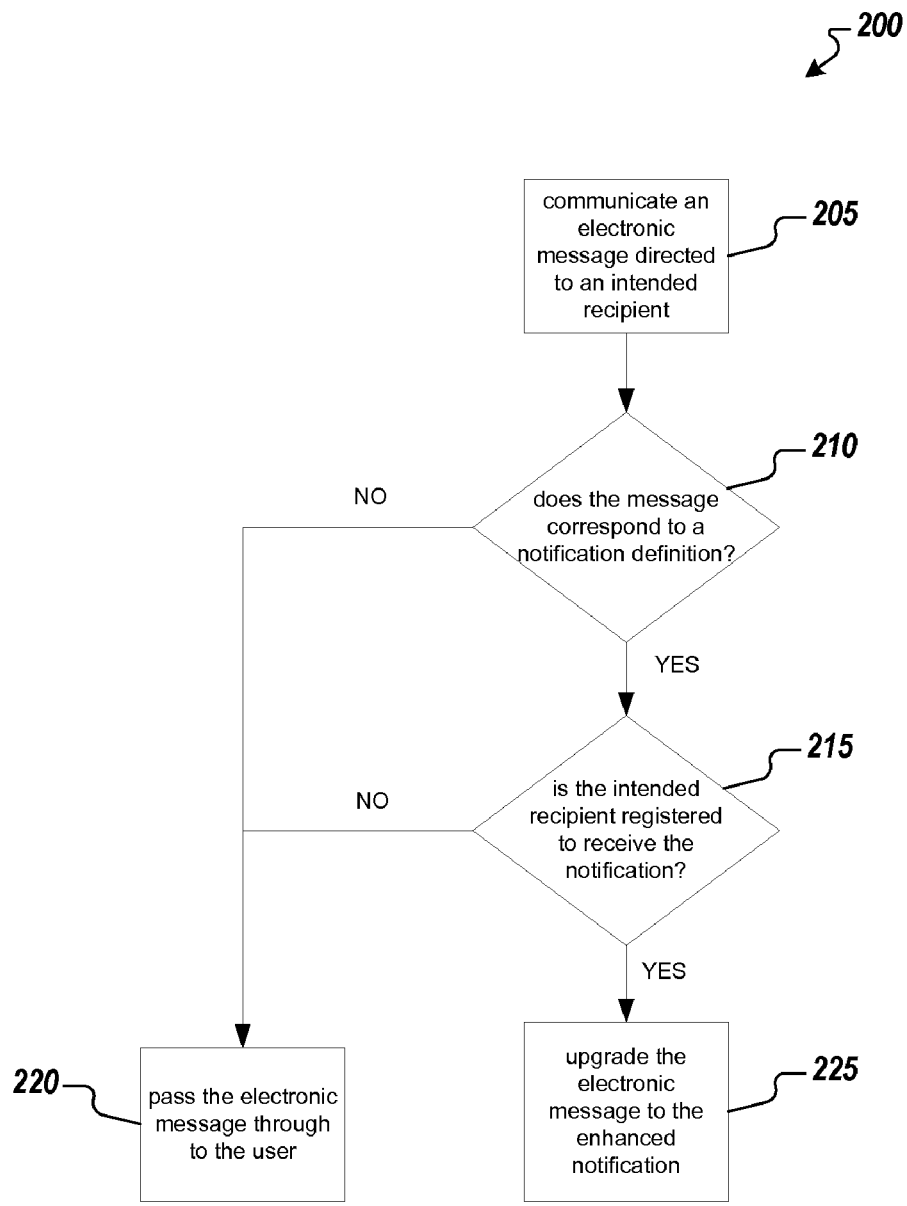
FIG. 2 is a flow diagram of a process implementable by the electronic communication system of FIG. 1.

FIG. 2 illustrates a flow diagram of a process 200 implementable by, for example, the system 100 of FIG. 1 to deliver an enhanced notification to the intended recipient of the electronic message. The message source 150 communicates to the message enhancement service 120 an electronic message to be directed to the intended recipient 105 (step 205). The message enhancement service 120 may use the matching engine 130 and the notification definition 135 to determine whether the electronic message corresponds to the notification definition (step 210). If there is correspondence, the message enhancement service 120 uses the user information 140 to determine whether the intended recipient 105 is registered to receive the enhanced notification (step 215). If these conditions are not satisfied, the electronic message is not reconfigured and is communicated through to the intended recipient 105 (step 220). Otherwise, the message enhancement service 220 reconfigures the electronic message to an enhanced notification and provides the enhanced notification to the intended recipient 105 according to the notification definition (step 225).

Figure 3:
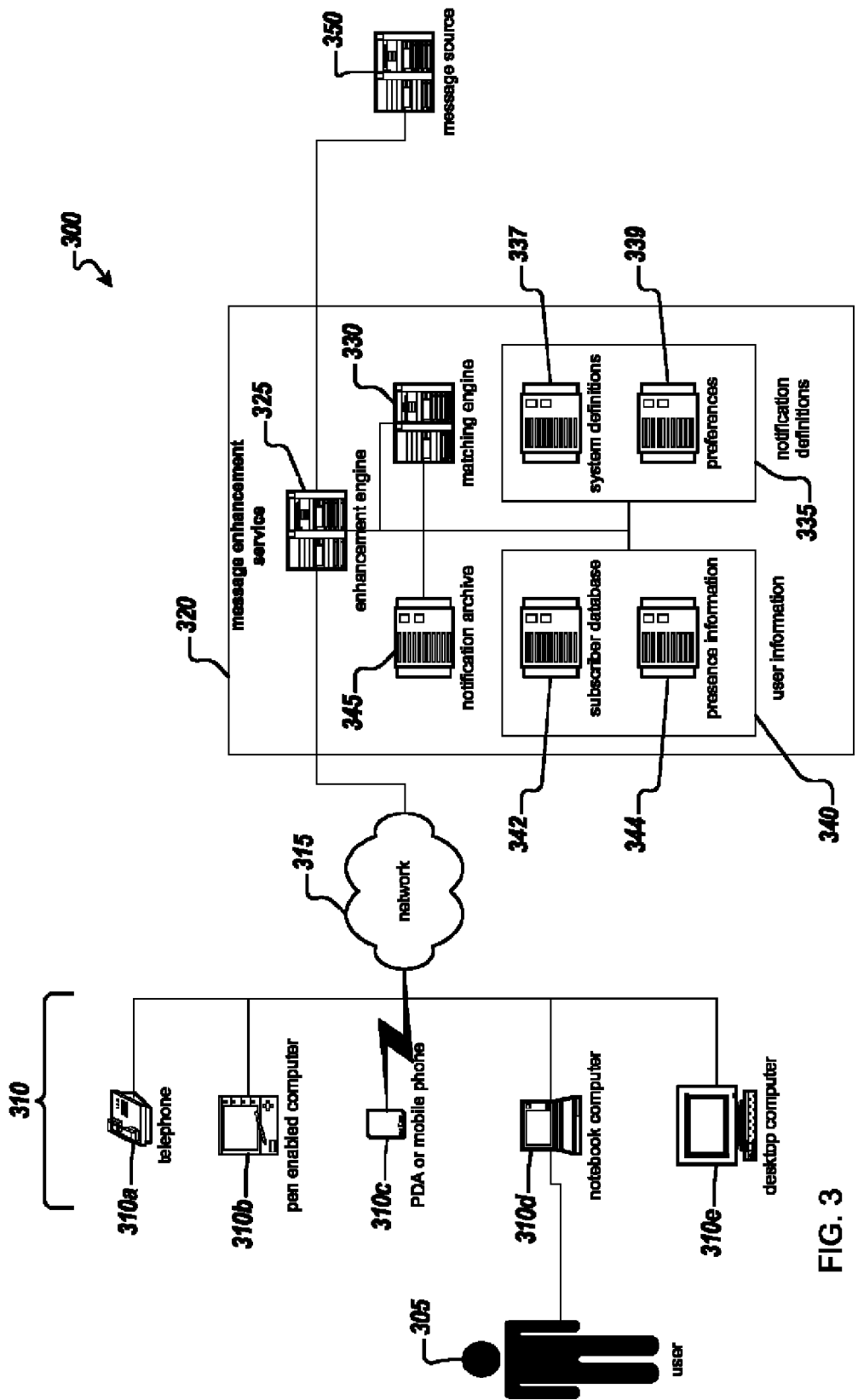
FIG. 3 is a schematic diagram of a system to reconfigure an electronic message to effect an enhanced notification.

Referring to FIG. 3, a generalized notification system 300 reconfigures an electronic message intended for user 305 to provide user 305 with an enhanced notification at one or more candidate delivery mechanisms 310. The notification includes enhanced features, such as, for example, cascaded delivery, an associated lifespan, or an enhanced presentation. The notification system 300 provides the notification to the delivery mechanisms 310 using a network 315 and a message enhancement service 320. Exemplary components of the notification system 300 are described in greater detail below.

The delivery mechanisms 310 generally are analogous to the candidate delivery mechanisms 110 of FIG. 1. Each delivery mechanism 310 may include any device, system, and/or piece of code that relies on another service to perform an operation. For example, a delivery mechanism 310 may include a device such as a telephone 310a, a pen-enabled computer 310b, a personal digital assistant (PDA) or mobile telephone 310c, a notebook computer 310d, and/or a desktop computer 310e. The delivery mechanisms 310 also or alternatively may include, for example, a Web browser, an email client, a synchronization client (e.g., a calendar synchronization client, or a task list synchronization client), an instant messaging (IM) client, a short message service (SMS) client, a business productivity application (e.g., a word processing program, or a spreadsheet program), and/or an operating system or operating system kernel residing on a device. The delivery mechanisms 310 may be arranged to operate within or in concert with one or more other systems, such as, for example, one or more LANs (local area networks) and/or one or more WANs (wide area networks).

Each of the delivery mechanisms 310 may be accessible to the message enhancement service 320, and the user 305 may access the message enhancement service 320 or another online service using one or more of the delivery mechanisms 310. For example, the user 305 may use the notebook computer 310d to access the message enhancement service 320.

A delivery mechanism 310 may format an enhanced notification received from message enhancement service 320 using a standard protocol, such as, for example, the standard generalized markup language (SGML), the extensible markup language (XML), the hypertext markup language (HTML), the extensible hypertext markup language (XHTML), the compact hypertext markup language (cHTML), the virtual reality markup language (VRML), the wireless markup language (WML), the voice extensible markup language (VXML), a document object model (DOM), or the dynamic hypertext markup language (DHTML). Properly formatted, the enhanced notification may enable the user 305 to interact with or to respond to the enhanced notification.

The notification system 300 also includes a message source 350. The message source 350 typically includes different services and sources of electronic messages, such as, for example, a third party service, an email, a discussion group, a chat room, a news service, a broker service, a banking service, a shopping service, a weather service, the World Wide Web, or an Internet service.

The message source 350 may provide an electronic message as a simple email intended to notify the user 305 of an event or of information. Numerous examples of possible subject matter exist, but, for brevity, only a few of those examples are described here. The electronic message may be based, for example, on a promotional advertisement, an account balance, a portfolio status, a credit status, an online status, information that an order and/or a service is complete, or a message regarding confirmation, cancellation, and/or rescheduling of an appointment. Other examples include, but are not limited to, a weather forecast and/or adverse weather conditions of a particular geographic region; a particular date, holiday and/or other special occasion; an online status of another user; a change to a predetermined web page; or entertainment programming and/or ticket information.

The message source 350 may employ one or more protocols (i.e., standards, formats, conventions, rules, and structures) to transfer information internally or to deliver electronic messages to a user. Protocols employed by the information service 330 may include, for example, the Internet protocol (IP), the transfer connection protocol (TCP), the hypertext transfer protocol (HTTP), the file transfer protocol (FTP), the user datagram protocol (UDP), the layer two tunneling protocol (L2TP) and/or the simple mail transfer protocol (SMTP).

In general, the message enhancement service 320 receives an electronic message from the message source 350 and reconfigures the electronic message to an enhanced notification. Reconfiguring the electronic message may include leaving the source electronic message unchanged while providing additional or alternative delivery options or other features. Reconfiguring the electronic message also may include providing a completely different message that is based on or references the source message. More particularly, the message enhancement service 320 monitors for electronic messages that match enhanced notifications to which the intended recipient is subscribed. The message enhancement service 320 may present the intended recipient with a subscription request when an electronic message matches an enhanced notification to which the intended recipient is not subscribed. If the user 305 desires, the user 305 may use the subscription request to instigate subscription to the enhanced notification, for example, by selecting the subscription request and receiving options responsive thereto.

When an electronic message is reconfigured to an enhanced notification, the message enhancement service 320 may provide the notification to the user 305 based on the lifespan, delivery precedence, or user information. For example, the message enhancement service 320 may deliver the enhanced notification to an email account of the user 305 based on a preference indicated when the user subscribed to the notification. Later, the message enhancement service 320 may detect that the user 305 is online during the lifespan period and may deliver an associated notification to the user 305 using a protocol and/or communication method appropriate for the user 305, for example, a pop-up window. If the user 305 first accesses the notification delivered to the email account (e.g., because the user 305 was reading email when the pop-up window was delivered), the associated redundant pop-up window notification may be automatically vacated, updated or removed. Alternatively, the email alert may be vacated, removed or updated in response to access by the user to the pop-up window. Similarly, messages of other types can be vacated, removed or updated based on user interaction with different messages or with other message types. If the user 305 fails to access a notification during the lifespan period, that notification and/or any related notification may be vacated, removed or updated. In this manner, the message enhancement service 320 may provide the notification to the user 305 with a minimum of delay while not burdening the user with redundant notifications.

The message enhancement service 320 may provide notifications in a certain order based on a delivery urgency. The delivery urgency may be related to notification subject matter and/or time sensitivity (e.g., as measured by lifespan). For example, a delivery urgency may define that a notification for a severe weather alert has a higher delivery urgency than a notification of a baseball score. Similarly, the delivery urgency may define that a notification with only thirty minutes of remaining lifespan has a higher urgency than a notification having 36 hours of remaining lifespan.

The message enhancement service 320 includes an enhancement engine 325 that receives the electronic message from the message source 350 and reconfigures the electronic message to the enhanced notification. The enhancement engine 325, alone or in conjunction with other services, may perform sorting, prioritizing, or other types of organizational processing on the enhanced notification so that the notification is delivered appropriately to the user 305.

More specifically, the enhancement engine 325 reconfigures the electronic message to the enhanced notification based on interaction with the matching engine 330, the notification definitions 335, and the user information 340. The matching engine 330 may compare the electronic message to the notification definitions 335, and may inform the enhancement engine 325 if a correspondence exists. If the electronic message corresponds to a notification definition 335, the enhancement engine 325 accesses the user information 340 to determine whether the user 305 is subscribed to the notification. If the user 305 is subscribed, the enhancement engine 325 uses the notification definition 335 to reconfigure the electronic message to the enhanced notification. The enhancement engine 325 provides the enhanced notification to the user 305 at one or more of the candidate delivery mechanisms 310 (e.g., using a cascaded delivery, or a simultaneous broadcast delivery to a plurality of the delivery mechanisms 310). In general, the enhancement engine 325 uses the user information 340 and the notification definitions 335 to select from among the candidate delivery mechanisms 310 one or more actual delivery mechanisms that are expected to provide the message to the user 305 without significant delay and/or with appropriate emphasis and formatting.

The notification definitions 335 may include system definitions 337 and user preferences 339. The system definitions 337 may be generated by the system or by an administrator of the system. The system definitions 337 may include, for example, definitions of classes of notifications, and/or definitions of each available notification. More specifically, the system definitions 337 may define, in whole, or in part, one or more conditions to be satisfied by the source and/or content of an electronic message before the corresponding enhanced notification will be provided—contingent upon subscription by the user 105. For example, before an electronic message will be reconfigured, the system definitions 337 may require that the electronic message derive from a specific source and/or include specific content.

The system definitions 337 also may define the range of functionality of the enhanced notifications and, hence, the scope of accommodation to user preferences (e.g., a user preference for a function not defined for the system cannot be accommodated). The system definitions also may provide a cascaded delivery definition and/or a lifespan (e.g., by forecasting a time period during which the notification is expected to be useful to a user). The system definitions 337 may make a variety of delivery and/or presentation methods available for selection by the user 305. For example, the system definitions 337 may enable user 305 to select to receive the notification as an instant message, an icon, a pop-up window, a video, a flashing indicator, and/or an audio or tactile alarm. The system definitions 337 also may provide for the enhanced notification to be provided to the user 305 conditioned on presence (online versus offline), and/or conditioned on use by the user 305 or intended delivery to a particular device or device type, for example, a wireless device (e.g., a mobile phone, a PDA, or a pager), a standard telephone, voicemail, and/or email if the user 305 so desires. The system definitions 337 may provide the user with flexibility to be notified in a manner that the user anticipates will most likely provide the notification to the user without significant delay.

The user preferences 339 generally include preferences of the user 305 regarding optional or selectable aspects of the system definitions 337. For example, the user preferences 339 may include a delivery preference of the user 305, a presentation preference of the user 305, or a lifespan preference of the user. The user preferences 339 may also include information to define, in finer detail, the conditions to be satisfied by the source and/or content of an electronic message before the corresponding enhanced notification will be provided.

For example, the user 305 may register for an auction alert. The subscriber engine 342 may record that the user 305 has registered for the auction alert. At registration, the user 305 also may provide notification preferences that will be added to the preferences 339 of the notification definitions 335. The user 305 may indicate that the enhanced auction notification will reconfigure simple email alerts sent to the user 305 by eBay® that relate to online auctions in which the user 305 participates. The auction notification will be delivered according to the cascaded delivery definition but will not be delivered after passage of the lifespan. Moreover, even if delivered, the auction notification may be deleted automatically if the user 305 does not access the auction notification (e.g., by viewing an associated pop-up window, and/or by accessing an associated email or voicemail message) prior to passage of the lifespan.

As another example, the user 305 may subscribe to reconfigure birthday email reminders to enhanced notifications. The message source 350 may provide the email reminders one week prior to the specified birthday and, again, the day before. Having properly subscribed, the email reminders are reconfigured to notifications having enhanced functionality. For example, the subsequent enhanced notification may replace the initial notification if the initial notification has not been accessed already.

Moreover, the user 305 may consider two weeks an upper bound for an acceptable belated birthday wish. As a result, the user 305 may configure the enhanced notifications with appropriate lifetimes. Using the lifespans, the enhanced notifications of the birthday may be removed automatically two weeks following the birthday if the user 305 has not accessed the notifications by that time.

In yet another example, the user 305 may subscribe to reconfigure marketing or sales messages (e.g., SPAM) to enhanced notifications. The enhanced notifications may have an associated short duration lifespan of hours or, perhaps, of a day. The enhanced notifications may provide the user 305 with the opportunity to examine the marketing or sales messages received for subject matter of interest. At the same time, the short lifespan relieves the user 305 of the need to attend to the sales or marketing notifications because each corresponding enhanced notification automatically will be deleted as its short lifespan is expended.

The user information 340 may include a subscriber engine 342 and presence information 344. The subscriber engine 342 may include a record of the enhanced notifications that the user 305 has subscribed to receive. Upon registration to receive an enhanced notification, the user 305 may inform the message enhancement service 320 of preferences regarding that enhanced notification. The message enhancement service 320 may include those preferences in the preferences 339 of the notification definitions 335.

The presence information 344 may include, for example, information indicating an online presence of the user 305 (e.g., information indicating that the user 305 is browsing the web, the user 305 has an active instant messaging session, the user 305 is online using a television, the user 305 is online using a game console, the user 305 is online using a networked radio, or the user 305 currently is active in a chat room discussion). The presence information 344 also may include information indicating a presence of the user at a particular device or a physical presence of the user. The physical presence information may be determined, for example, from a global positioning system associated with the user 305 and may be used to select a delivery mechanism within a predefined range of the intended recipient's physical presence.

The network 315 typically allows direct or indirect communication between the delivery mechanism 310 and the online service 320, irrespective of physical or logical separation. Examples of a network 315 include the Internet, the World Wide Web, WANs, LANs, analog or digital wired and wireless telephone networks (e.g., PSTN, ISDN or xDSL), radio, television, cable, satellite, and/or any other delivery mechanism for carrying data. The network 315 may be secured or unsecured.

Each of the delivery mechanism 310, the network 315, and the message enhancement service 320 may further include various mechanisms for delivering voice and/or non-voice data, such as, for example, the short message service, the wireless application protocol (WAP), the transport connection protocol (TCP), the Internet protocol (IP), the World Wide Web, one or more local area networks, and/or one or more wide area networks. The delivery mechanism 310, the network 315, and the message enhancement service 320 also may include analog or digital wired and wireless telephone networks, such as, for example, public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying voice or non-voice data.

The message enhancement service 320 also may include a notification archive 345. The notification archive 345 may be used to retain versions of each enhanced notification actually provided or for which delivery was attempted but failed. The notification archive 345 also may record with respect to each notification the device or devices to which the notification was delivered or for which delivery failed, and the dates and times of those occurrences. In instances of failed delivery, the notification archive 345 may store information indicative of the cause of failed delivery, such as, for example, that a mailbox full message was received in association with an attempted email notification. The notification archive 345 may enable users, for example, to access a history of notifications for which they were an intended recipient (e.g., notifications of the last week or month) and/or to access archived versions of any past notification provided to them.

The notification archive 345 may include one or more databases that may reside at any appropriate location (e.g., local location, remote location, third party location), and also may reside on any appropriate storage medium 180 such as, for example, a magnetic disc array, or an optical disk array. These databases may be included in a single physical or logical structure, or they may be physically or logically distinct.

One or more other services may be included in the components of notification system 300 and/or these components (hereinafter the system services) may be included as part of one or more other services. For example, the system services may include or be included in a general-purpose or a special-purpose computer (e.g., a personal computer, a PDA, or a device specifically programmed to perform certain tasks), a database, a local area network, and/or a wide area network. In any event, the response to and execution of instructions received by any or all of the system services may be controlled by, for example, a program, a piece of code, an instruction, a device, a computer system, or a combination thereof, for independently or collectively instructing the services to interact and operate as described herein.

Figure 4:
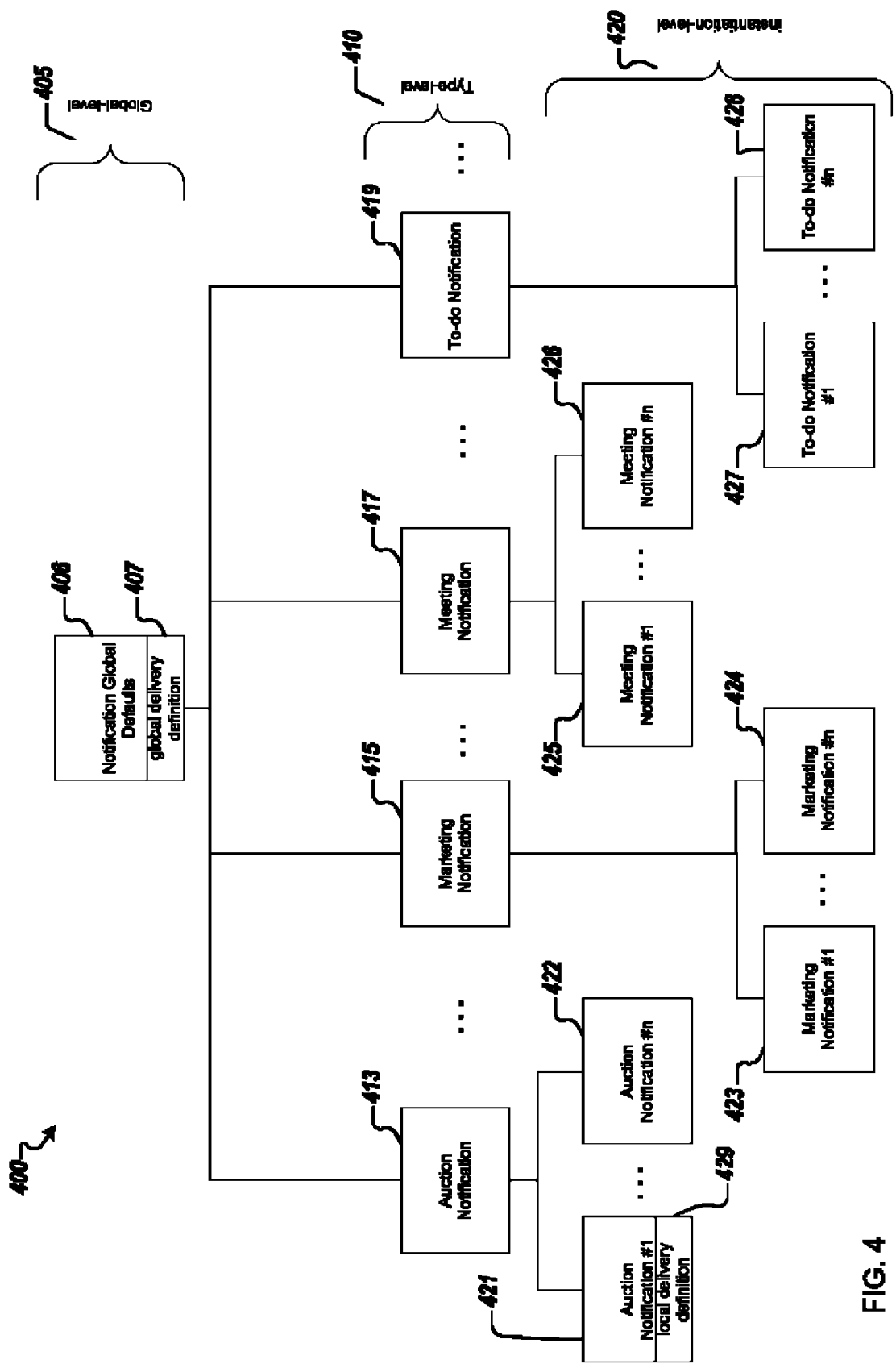
FIGS. 4-6 illustrate an exemplary data structure that may be associated with enhanced notifications achieved using the system of FIG. 3.

FIG. 4. illustrates a notification data structure 400 that may be used by the message enhancement service 320 of FIG. 3 to maintain the notification definitions 335. The notification data structure 400 is structured as a hierarchical tree and provides a logical representation of the notification definitions 335. For example, a highest hierarchical level of the notification data structure 400 includes a global-level 405 having a notification global defaults node 406 representative of a generalized notification.

A lower type-level 410 of the notification data structure 400 further defines notifications according to notification types. For example, as shown, the notifications may include an auction notification type 413, a marketing notification type 415, a meeting notification type 417, and a to-do notification type 419, among others. Still further, the notification data structure 400 includes an instantiation-level 420 to identify and define activated instantiations of each notification type (e.g., the auction notification type 413). For example, the auction notification type 413 may include instantiations of that notification activated by user subscription (e.g., auction notification #1 421 through auction notification #n 422). Other instantiations include marketing notification #1 423 through marketing notification #n 424, meeting notification #1 425 through meeting notification #n 426, and to-do notification #1 427 through to-do notification #n 428.

Each level of the notification data structure 400 may include both system definition information (e.g., system definitions 337) and user preference information (e.g., preferences 339) for the notification definitions 335. For example, the notifications global-level 405 may include system-defined delivery information and user-defined delivery information. To the extent that there is contradiction, the user preference information may preempt the system definition information for a given hierarchical level of the notification data structure 400. Moreover, each node of the notification data structure 400 may be configured to inherit notification definitions 335 from a node of a higher hierarchical level from which the node depends. Stated differently, notification definitions 335 may pass from a higher hierarchical level of the notification data structure 400 to a lower level to provide information missing at the lower level.

For example, the notifications global node 406 includes a global delivery definition 407. Since the auction notification type 413 lacks its own delivery definition, the auction notification type 413 inherits the global delivery definition 407 from the notification global defaults 406. However, auction notification #1 421, an instantiation of the auction notification type 413, includes a local delivery definition 429. To the extent that the local delivery definition 429 is complete, that definition overrides the global delivery definition 406 that it would inherit otherwise. On the other hand, auction notification #n 422, a further instantiation of the auction notification type 413, does not include a delivery definition and inherits the global delivery definition 407 from the auction notification type 413.

Figure 5:
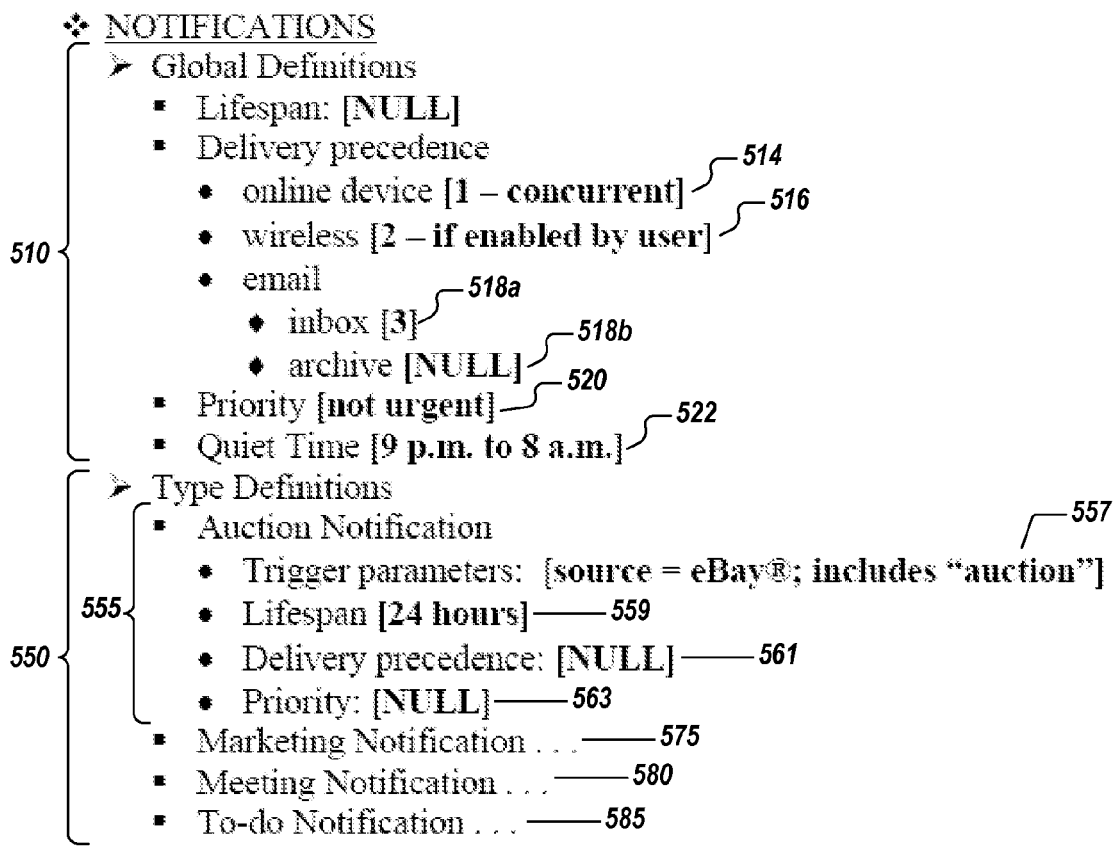
Figure 6:
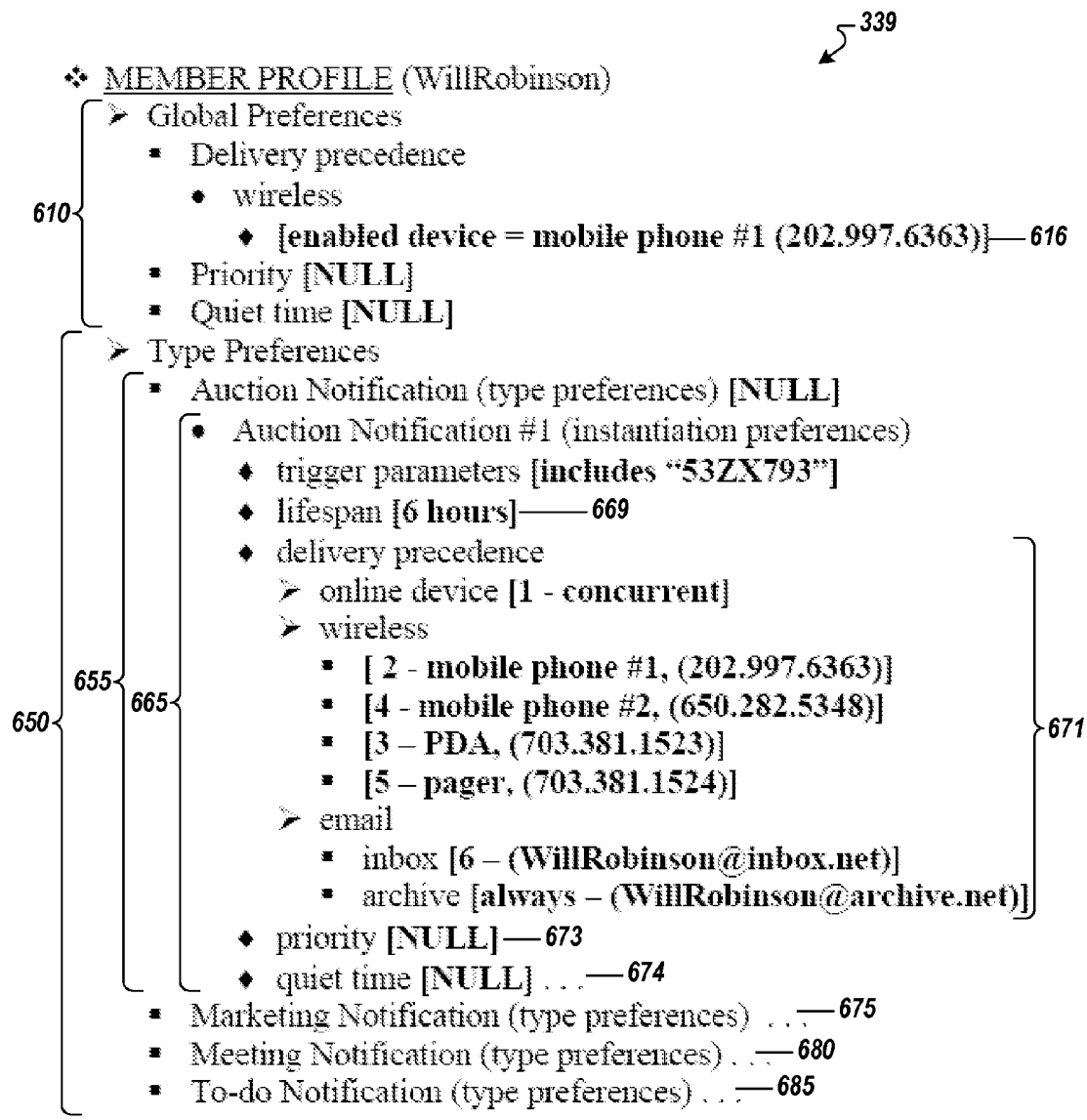

FIGS. 5 and 6 illustrate an implementation of the notification data structure 400 that includes data structures for structuring the system definitions 337 and the user preferences 339, respectively. The exemplary data structures of FIGS. 5 and 6 are similar and parallel each other.

Referring to FIG. 5, the notification data structure 400 includes system definitions 337. The system definitions 337 include global definitions 510 and type definitions 550. The global definitions 510, for example, provide that a notification may include a lifespan. As indicated by the null value, however, the global definitions 510 do not provide a global default lifespan value. The global definitions 510 also indicate a global delivery precedence that controls whether and/or when the enhancement engine 325 provides an enhanced notification to a particular delivery mechanism. More specifically, the global definitions 510 instruct the enhancement engine 325 to select the following delivery mechanisms as delivery recipients in the order of preference shown: (1) an online device 514, if the user is online, (2) a wireless client 516, if wireless delivery is enabled for the user, and (3) an email inbox 518a. Lastly, an email archive 518b is provided for, but is not activated as a delivery option in this configuration.

Delivery to the online device 514 is designated as "concurrent." Concurrent delivery indicates that the notification will be delivered online if the presence information 344 indicates that the user 305 currently is online, even if the notification already had been or will also be delivered to the user 305 offline. The global definitions also define notification priority 520 to be "not urgent," and that a "quiet time" 522 applies between 9:00 PM and 8:00 AM during which only urgent notifications are delivered to attract the immediate attention of the user 305.

Additionally, the system definitions 500 include type definitions 550 that define, for example, an auction notification type 555, a marketing notification type 575, a meeting notification type 580, and a to-do reminder alert 585. For brevity, only the auction notification type 555 is described in detail as the other notification types are similar in most relevant aspects. The auction notification type 555 defines, for example, trigger parameters 557, which, if satisfied by the electronic message, will cause the electronic message to be reconfigured to an auction notification type 555. In this case, the trigger parameters 557 require that the electronic message be provided by eBay®, and that the content of the electronic message include the term "auction." The auction notification type 555 also defines a twenty-four hour lifespan 559. In addition, although it does not do so here, the auction notification type 555 may define an associated delivery precedence 561 and notification priority 563.

Referring to FIG. 6, the notification data structure 400 also may include a user profile with user preferences 339 Like the system definitions 337, the user preferences 339 include global preferences 610, and type preferences 650. In the illustration of FIG. 6, all of the global preferences are null valued except for wireless delivery preference 616. That preference indicates that mobile phone #1 is enabled generally to receive notifications for WillRobinson. To enable mobile phone #1 to receive notifications, WillRobinson may identify mobile phone #1 as a preferred delivery mechanism and may identify contact information related to mobile phone #1, such as, for example, an associated phone number (202) 997-6363. Although mobile phone #1 is enabled, no associated delivery precedence is provided.

The type preferences 650 may include preferences for various notification types for which WillRobinson has subscribed, such as, for example, the auction notification type 655, the marketing notification type 675, the meeting notification type 680, and/or the to-do notification type 685. For brevity, FIG. 6 provides detail only for the auction notification type 655. The auction notification type 655 includes type-level preferences and a single auction notification instantiation (i.e., auction notification #1 665) having associated instantiation preferences. The type preferences for the auction notification type 655 are null valued.

Nevertheless, at the instantiation level, auction notification #1 665 defines the lifespan as 6 hours, based, for example, on an expectation of the user that the auction will proceed quickly. The auction notification #1 665 also defines the following delivery precedence 671: (1) an online device (if the user is online), (2) a mobile phone #1, (3) a PDA, (4) a mobile phone #2, (5) a pager, and (6) an email inbox. Lastly, an email archive is identified to always receive notification. In addition, the auction notification #1 665 defines the notification priority 673 as "urgent," while leaving "quiet time" 674 undefined as a null value.

Figure 7:
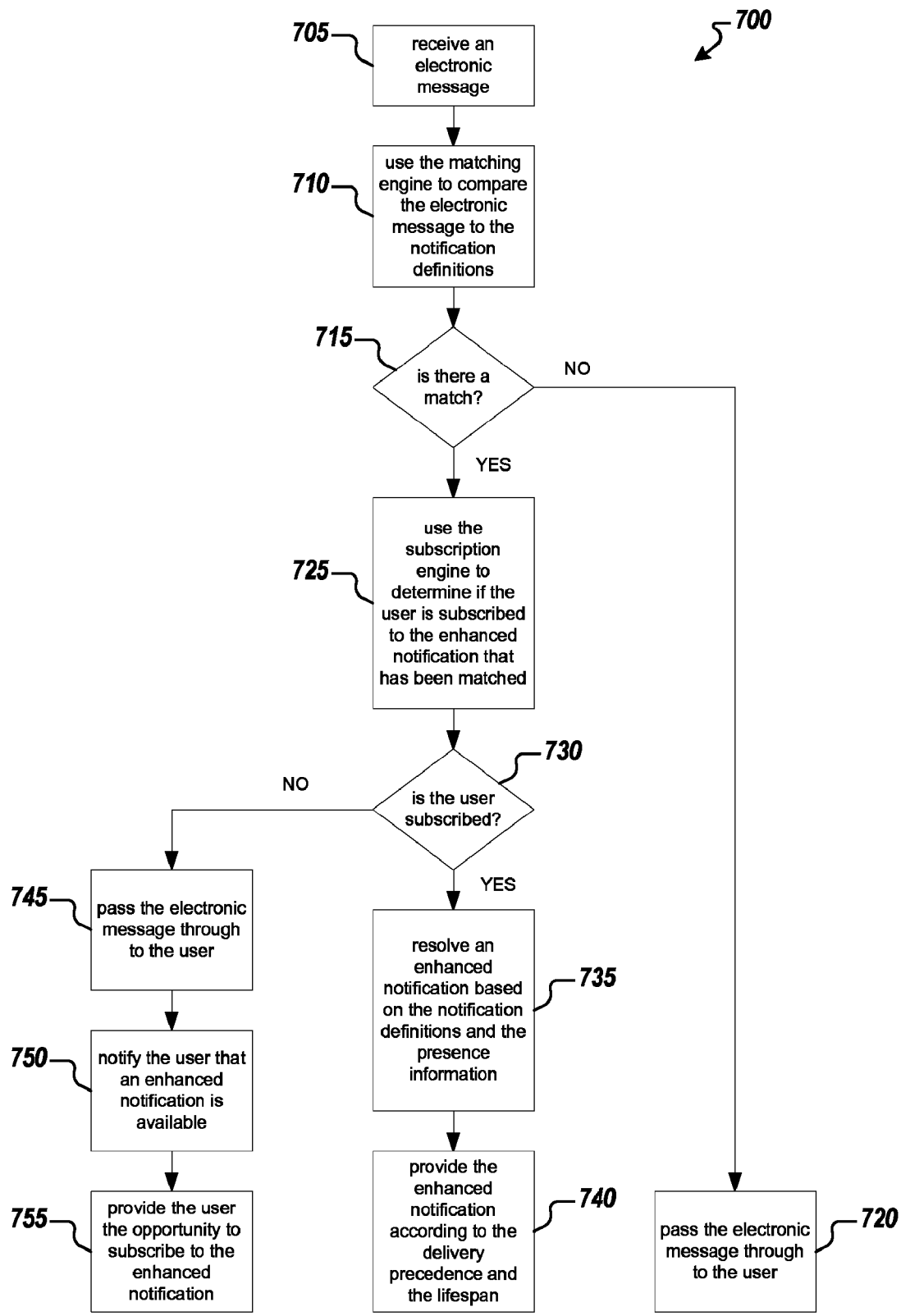
FIGS. 7-9 are flow diagrams illustrating an exemplary process implementable by the system of FIG. 3.

FIG. 7 illustrates a flow diagram of a process 700 implementable by, for example, the system of FIG. 3 to reconfigure an electronic message to an enhanced notification. Initially, the message enhancement service receives an electronic message from a message source (step 705). The enhancement engine uses the matching engine to compare the electronic message to the notification definitions including, for example, the trigger parameters. (step 710). If there is a match (step 715), the enhancement engine uses the subscriber engine to determine whether the user is subscribed to the enhanced notification that has been matched (step 725); otherwise the electronic message is not reconfigured but is passed through to the user (step 720).

If there is a match (step 715) and the user is subscribed to the enhanced notification (step 730), the enhancement engine resolves the enhanced notification (step 735). The enhanced notification is resolved based on the notification definitions, such as, for example, the system definitions and the user preferences, and the presence information (step 735). The enhancement engine provides the enhanced notification to the user at a selected delivery device, for instance, according to a delivery precedence and/or a lifespan of the enhanced notification (step 740).

If the user, however, is not subscribed to the enhanced notification (step 730), the electronic message is not reconfigured but is passed through to the user (step 745). The message enhancement service notifies the user that the enhanced notification is available (step 750), and uses the subscriber engine to provide the opportunity to the user to subscribe to the enhanced notification (step 755).

Figure 8:
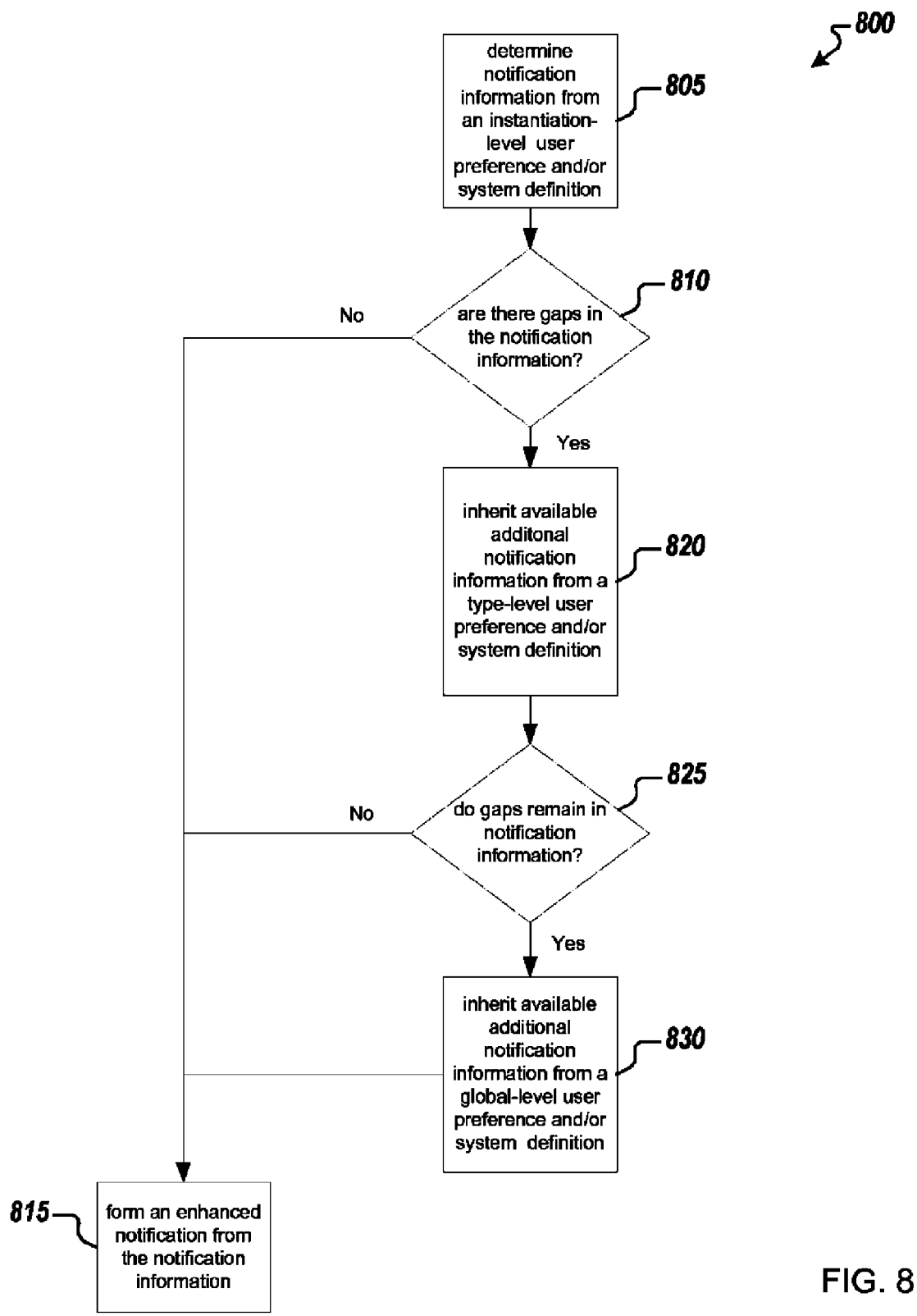

Referring to FIG. 8, an enhanced notification, in whole or in part, may be resolved (step 735 of FIG. 7) using process 800. Resolving the enhanced notification includes determining notification information from an instantiation-level user preference and/or system definition (step 805). If no gaps are identified in the notification information (step 810), the enhanced notification is formed based on the notification information (step 815). Otherwise, if gaps are identified (step 810), additional notification information is inherited from a type-level user preference and/or system definition (step 820). The supplemented notification information is evaluated for completeness again (step 825). If the supplemented notification information is complete, the enhancement engine 325 forms the enhanced notification based on that information (step 815). Otherwise, the enhancement engine 325 forms the enhanced notification (step 815) after the notification information is supplemented further through inheritance based on a global-level user preference and/or system definition (step 840). The enhanced notification may be formed, for example, by converting the relevant notification information into a format or protocol required for delivery.

Figure 9:
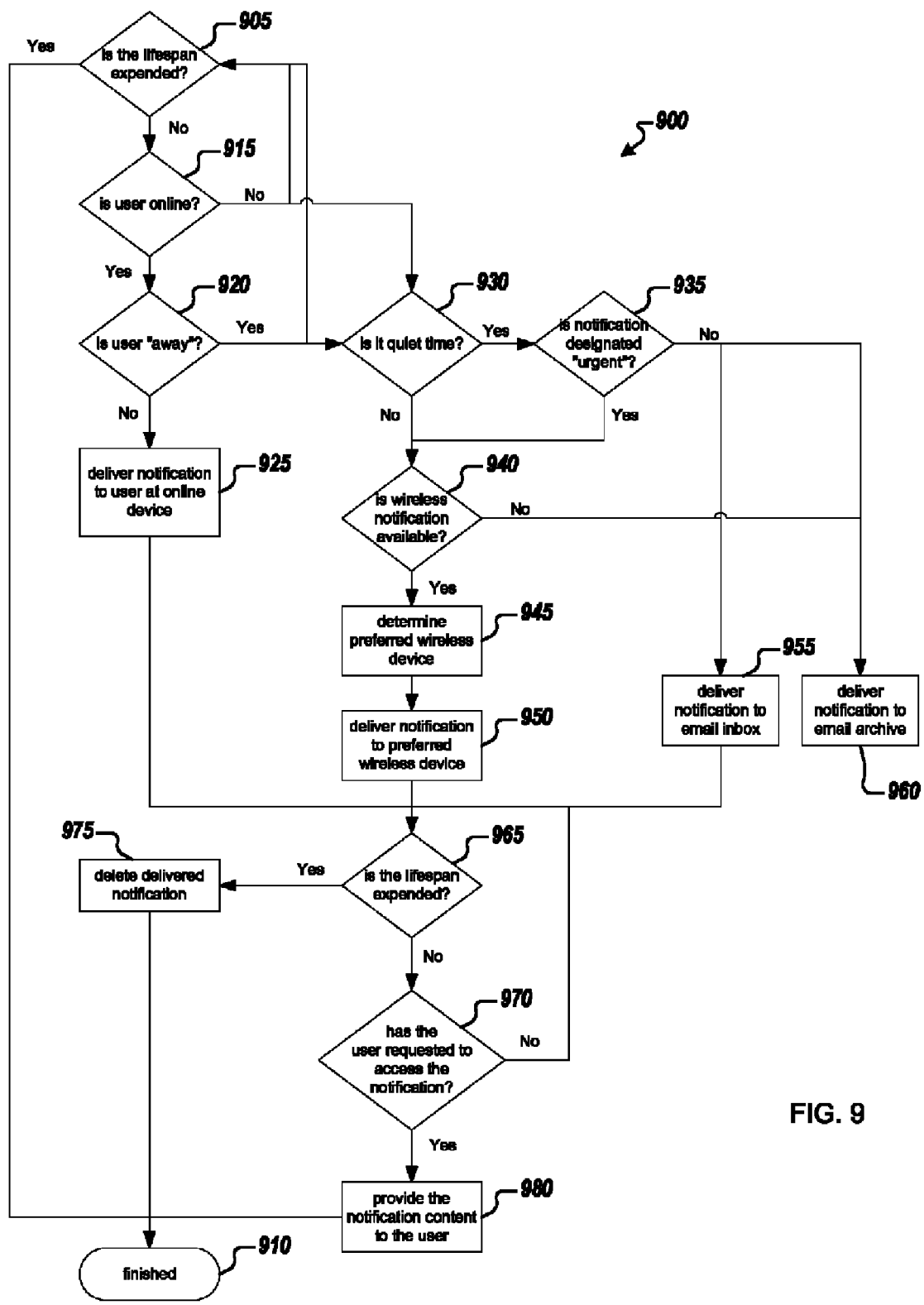

FIG. 9 illustrates a flow diagram of a process 900 implementable by, for example, the system of FIG. 3 to provide to the user an enhanced notification. By way of illustration, the enhanced notification may include a lifespan and a delivery precedence that seeks to notify the user first online, second at a wireless device, and third via email. Providing the enhanced notification includes determining whether the lifespan of the enhanced notification has been expended (step 905). If the lifespan is expended, the message enhancement service 320 does not provide the enhanced notification and the process is finished (step 910).

If the lifespan is not expended (step 905), then the message enhancement service 320 uses the presence information to determine whether the user 305 is online (step 915). If the user 305 is online, the message enhancement service 320 determines further whether the user 305 is away temporarily (e.g., although having an established an online session, the user 305 has marked himself as "away," or the user 305 has engaged in no online activity for a predetermined period of time) (step 920). If the message enhancement service 320 determines that the user 305 is online and is not away from the online delivery mechanism, the message enhancement service 320 delivers the notification to that online delivery mechanism (step 925).

If the message enhancement service 320 determines, however, that the user 305 is not online (step 915), or is away from the online delivery mechanism (step 920), then the message enhancement service 320 determines again if the lifespan is expended (step 905) and continues to monitor for an online presence of the user 305 (steps 915 and 920).

Concurrently with online delivery, the message enhancement service 320 determine whether it presently is "quiet time" for the user 305 (step 930). The message enhancement service 320 also determines whether the enhanced notification is designated as "urgent" (e.g., an enhanced notification might be marked "urgent" when the notification provides an alert that a tornado has been spotted near the user's home address) (step 935). Where the message enhancement service 320 determines that it is not "quiet time" or that the notification is "urgent" (i.e., "urgency" overrides "quiet time"), the message enhancement service 320 determines whether wireless notification is available for the user 305 (e.g., through notification to a mobile phone, a PDA, a pager) (step 940). If wireless notification is available, the message enhancement service 320 determines a wireless delivery mechanism at which the user 305 prefers to receive the notification (step 945) and delivers the notification to that wireless delivery mechanism (step 950).

However, should the message enhancement service 320 determine that it is "quiet time" (step 930) and that the notification is not "urgent" (step 935), or that wireless notification is unavailable (step 940), the message enhancement service 320 delivers the notification to an email inbox (step 955). Irrespective of delivery or lack of delivery to other delivery mechanisms, the message enhancement service 320 also delivers the notification to an email archive (step 960).

Whether the enhanced notification is provided online, to a wireless device, or to an email inbox, the lifespan of the enhanced notification is monitored until the lifespan is expended or the user 305 accesses the notification (steps 965 and 970). If the lifespan of the notification becomes expended before the user accesses the notification (step 965), the notification may be vacated (e.g., the notification may be deleted from a notification delivery mechanism to which the notification was delivered) (step 975) and the delivery process may be concluded (step 910). Otherwise, if the notification is accessed by the user before the notification lifespan becomes expended (step 970), the content of the notification is provided to the user (step 980), and the delivery process may be concluded (step 910).

Alternatively, or in addition, after the user accesses the provided notification (step 970), the message enhancement service 320 may cause to be vacated redundant instances of the same notification that were delivered to other delivery mechanisms. For example, those redundant instances of the notification might be vacated as the lifespan period becomes expended. In another implementation, accessing of the enhanced notification by the user 305 may trigger the message enhancement service 320 to cause the redundant instances of the notification to be vacated. For example, access by the user of an online notification may cause the message enhancement service to transmit a secured (e.g., authenticated and encrypted) recall message to an email inbox to which a now redundant notification concurrently was delivered. The secured recall message may act to remove the redundant notification from the inbox before the redundant notification becomes a source of inconvenience to the user.

Figure 10:
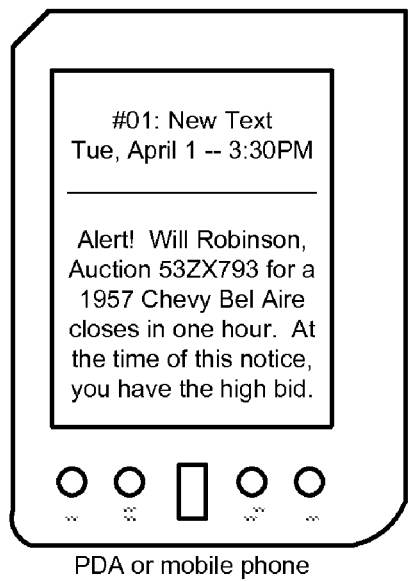
FIG. 10 illustrates an exemplary enhanced notification provided to a user at a mobile device.

FIG. 10 illustrates an auction notification that may be delivered to a PDA or mobile phone of a user. The PDA or mobile phone notifies the user "Alert! Will Robinson. Auction 53ZX793 for a 1957 Chevy Bel Aire closes in one hour. At the time of this notice, you have the high bid." In general, the auction notification may include any type of instant message, pop-up window, icon, and or audible or tactile alarm capable of gaining the attention of the user. The auction notification may present information derived from the electronic message of the message source. In addition, or in the alternative, the auction notification may include the contents of the electronic message. In another aspect, the auction notification may include an edit button for editing the presentation of the notification, and a respond/more information button for accessing the auction using the online service to update a bid and/or to obtain more detailed information regarding the auction.

The following scenario serves to illustrate exemplary implementations involving the processes and systems described.

A business may generate notification content but may partner with a notification provider for delivery of that content reconfigured according to parameters provided by the business. For example, a partner business may agree to notify a customer of customer account information each month. The business may communicate a message to the notification provider that includes text appropriate for such a reminder. The business also communicates a configuration instruction that is used by the notification provider to effect the desired message reconfiguration. The configuration instruction may be included as part of the original message text (to be recognized and removed by the notification provider during reconfiguration), in a header, or in an out-of-band communication with the notification provider.

The business also may enable the notification provider to supplement the notification content in an appropriate manner. For example, the configuration instruction may include schedule information indicating requested timing for the user's monthly reminder and access information for authenticated access to the user's account. In receipt of this information, the notification provider establishes a notification to be delivered to the user on the monthly schedule and based on the provided text and information to be gleaned through access to the user's account. Thereafter, when the monthly notification is triggered, access to the account information is obtained, an attachment is generated based on a screenshot or other representation of the account info, and a notification is delivered that integrates the notification text and the account information attachment.

Other implementations are within the scope of the following claims.

What is claimed is:

1. A method comprising:
   receiving, from a message source and at a notification system, a first electronic communication of a first type;
   identifying, using the notification system, the message source of the first electronic communication;
   accessing, from electronic storage, subscription data of a recipient of notifications from the notification system;
   determining, using the notification system, whether the recipient is subscribed to receive notifications for electronic communications originated by the message source based on the identified message source of the first electronic communication and the accessed subscription data of the recipient; and
   based on a determination that the recipient is subscribed to receive notifications for electronic communications originated by the message source:
      reconfiguring, using the notification system, the first electronic communication of the first type into a second electronic communication of a second type that is addressed to the recipient, the second type of electronic communication being different than the first type of electronic communication; and
      sending, using the notification system, the second electronic communication of the second type to the recipient.

2. The method of claim 1 further comprising:
   determining presence information of the recipient; and
   reconfiguring the first electronic communication based on the presence information of the recipient.

3. The method of claim 2 wherein the presence information includes information related to online presence of the recipient at a time that preparation is made to provide an enhanced notification to the recipient.

4. The method of claim 1 further comprising:
   accessing stored criteria related to a system definition;
   evaluating whether or not to reconfigure the first electronic communication as the second type of electronic communication based on the system definition; and
   reconfiguring the first electronic communication based on the system definition.

5. The method of claim 4 wherein the system definition includes a cascaded delivery definition, and reconfiguring comprises reconfiguring the first electronic communication based on the cascaded delivery definition.

6. The method of claim 5 wherein the cascaded delivery definition lists several delivery mechanisms, and wherein sending the second electronic communication comprises selecting a delivery mechanism from within the cascaded delivery definition that appears available to provide an enhanced notification to the recipient without significant delay.

7. The method of claim 1 further comprising:
   accessing stored criteria related to a user preference;
   evaluating whether or not to reconfigure the first electronic communication as the second type of electronic communication based on the user preference; and
   reconfiguring the first electronic communication based on the user preference.

8. The method of claim 1 wherein reconfiguring the first electronic communication comprises providing or modifying a lifespan.

9. The method of claim 8 wherein the lifespan comprises a time period during which information of an enhanced notification is reasonably expected usefully to inform an action of the recipient.

10. The method of claim 8 further comprising vacating the second electronic communication when the recipient does not access the second electronic communication during the lifespan.

11. The method of claim 8 further comprising:
    providing a plurality of instances of the second electronic communication to the recipient based on the lifespan;
    sensing that an instance of the second electronic communication has been accessed by the recipient; and
    vacating an instance of the second electronic communication not yet accessed by the recipient.

12. The method of claim 1 further comprising:
    providing the recipient with access to the first electronic communication by interacting with an aspect of the second electronic communication.

13. The method of claim 1 further comprising:
    allowing the recipient to interact with the second electronic communication; and
    updating or eliminating a related instance of the second electronic communication based on the recipient interacting with the reconfigured message.

14. A system comprising:
    at least one computer; and
    at least one computer-readable medium coupled to the at least one computer having instructions stored thereon which, when executed by the at least one computer, causes the at least one computer to perform operations comprising:
       receiving, from a message source and at a notification system, a first electronic communication of a first type;
       identifying, using the notification system, the message source of the first electronic communication;
       accessing, from electronic storage, subscription data of a recipient of notifications from the notification system;
       determining, using the notification system, whether the recipient is subscribed to receive notifications for electronic communications originated by the message source based on the identified message source of the first electronic communication and the accessed subscription data of the recipient; and
       based on a determination that the recipient is subscribed to receive notifications for electronic communications originated by the message source:
          reconfiguring, using the notification system, the first electronic communication of the first type into a second electronic communication of a second type that is addressed to the recipient, the second type of electronic communication being different than the first type of electronic communication; and sending, using the notification system, the second electronic communication of the second type to the recipient.

15. The system of claim 14 wherein the operation further comprise:
  determining presence information of the recipient; and
  reconfiguring the first electronic communication based on the presence information of the recipient.

16. The system of claim 15 wherein the presence information includes information related to online presence of the recipient at a time that preparation is made to provide an enhanced notification to the recipient.

17. The system of claim 14 wherein the operation further comprise:
  accessing stored criteria related to a system definition;
  evaluating whether or not to reconfigure the first electronic communication as the second type of electronic communication based on the system definition; and
  reconfiguring the first electronic communication based on the system definition.

18. The system of claim 17 wherein the system definition includes a cascaded delivery definition, and reconfiguring comprises reconfiguring the first electronic communication based on the cascaded delivery definition.

19. The system of claim 18 wherein the cascaded delivery definition lists several delivery mechanisms, and wherein sending the second electronic communication comprises selecting a delivery mechanism from within the cascaded delivery definition that appears available to provide an enhanced notification to the recipient without significant delay.

20. At least one computer-readable storage medium encoded with at least one computer program comprising instructions that, when executed, operate to cause a computer to perform operations comprising:
  receiving, from a message source and at a notification system, a first electronic communication of a first type;
  identifying, using the notification system, the message source of the first electronic communication;
  accessing, from electronic storage, subscription data of a recipient of notifications from the notification system;
  determining, using the notification system, whether the recipient is subscribed to receive notifications for electronic communications originated by the message source based on the identified message source of the first electronic communication and the accessed subscription data of the recipient; and
  based on a determination that the recipient is subscribed to receive notifications for electronic communications originated by the message source:
    reconfiguring, using the notification system, the first electronic communication of the first type into a second electronic communication of a second type that is addressed to the recipient, the second type of electronic communication being different than the first type of electronic communication; and
    sending, using the notification system, the second electronic communication of the second type to the recipient.

21. A method comprising:
  receiving, from a message source and at a notification system, a first electronic communication of a first type;
  identifying, using the notification system, the message source and a class of notification of the first electronic communication;
  accessing, from electronic storage, subscription data of a recipient of classes of notifications from the notification system;
  determining, using the notification system, whether the recipient is subscribed to receive notifications of the class of notification of the first electronic communication for electronic communications originated by the message source based on the identified message source of the first electronic communication and the accessed subscription data of the recipient; and
  based on a determination that the recipient is subscribed to receive notifications of the class of notification of the first electronic communication for electronic communications originated by the message source:
    reconfiguring, using the notification system, the first electronic communication of the first type into a second electronic communication of a second type that is addressed to the recipient, the second type of electronic communication being different than the first type of electronic communication; and
    sending, using the notification system, the second electronic communication of the second type to the recipient.

22. The method of claim 21 further comprising:
determining presence information of the recipient; and
reconfiguring the first electronic communication based on the presence information of the recipient.

23. The method of claim 21 further comprising:
accessing stored criteria related to a system definition;
evaluating whether or not to reconfigure the first electronic communication as the second type of electronic communication based on the system definition; and
reconfiguring the first electronic communication based on the system definition.

24. The method of claim 21 further comprising:
accessing stored criteria related to a user preference;
evaluating whether or not to reconfigure the first electronic communication as the second type of electronic communication based on the user preference; and
reconfiguring the first electronic communication based on the user preference.

25. The method of claim 21 wherein reconfiguring the first electronic communication comprises providing or modifying a lifespan.

26. The method of claim 21, wherein the class of notification of the first electronic communication comprises at least one of an auction notification, birthday reminder notification, marketing notification, meeting notification, and reminder notification.

* * * * *

UNITED STATES PATENT AND TRADEMARK OFFICE
CERTIFICATE OF CORRECTION

| | | |
|---|---|---|
| PATENT NO. | : 8,001,199 B2 | Page 1 of 1 |
| APPLICATION NO. | : 12/626099 | |
| DATED | : August 16, 2011 | |
| INVENTOR(S) | : Barry Appelman et al. | |

It is certified that error appears in the above-identified patent and that said Letters Patent is hereby corrected as shown below:

Claim 15, col. 17, lines 4-5, "further comprise" should read -- further comprises --.

Claim 17, col. 17, lines 14-15, "further comprise" should read -- further comprises --.

Signed and Sealed this
Twenty-seventh Day of December, 2011

David J. Kappos
*Director of the United States Patent and Trademark Office*